(12) United States Patent
Lim et al.

(10) Patent No.: US 8,270,984 B2
(45) Date of Patent: Sep. 18, 2012

(54) APPARATUSES AND METHODS FOR TRANSMITTING AND RECEIVING CONTROL INFORMATION IN A WIRELESS COMMUNICATION SYSTEM BASED ON COGNITIVE RADIO (CR)

(75) Inventors: Eun-Taek Lim, Suwon-si (KR); Jung-Soo Woo, Suwon-si (KR); Do-Young Kim, Yongin-si (KR); Cheng Shan, Suwon-si (KR); Sang-Bum Kim, Seoul (KR); Yong-Ho Park, Cheonan-si (KR); Geun-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 530 days.

(21) Appl. No.: 12/380,386

(22) Filed: Feb. 26, 2009

(65) Prior Publication Data

US 2009/0215451 A1    Aug. 27, 2009

(30) Foreign Application Priority Data

Feb. 27, 2008    (KR) .................. 10-2008-0017675

(51) Int. Cl.
*H04W 24/00*    (2009.01)
(52) U.S. Cl. .................... 455/450; 455/434; 455/452.1; 455/509; 455/522; 370/208; 370/343; 370/329
(58) Field of Classification Search ............... 455/450, 455/434, 452.1, 509, 522; 370/208, 343, 370/329
See application file for complete search history.

(56) References Cited

U.S. PATENT DOCUMENTS

| | | | |
|---|---|---|---|
| 7,859,985 B2* | 12/2010 | Schmidl et al. | 370/208 |
| 2008/0051037 A1* | 2/2008 | Molnar et al. | 455/70 |
| 2008/0159323 A1* | 7/2008 | Rinne et al. | 370/431 |
| 2009/0219909 A1* | 9/2009 | Ko et al. | 370/343 |
| 2010/0022264 A1* | 1/2010 | Kwon et al. | 455/509 |

* cited by examiner

*Primary Examiner* — Jinsong Hu
*Assistant Examiner* — Jean Chang

(57) ABSTRACT

A wireless communication system based on a Cognitive Radio (CR) is provided. A method includes checking channels unused by a licensed system through a spectrum sensing; selecting one of the channels unused by the licensed system as a control channel based on a channel quality per channel; and transmitting control information to terminals within a cell over the control channel.

22 Claims, 6 Drawing Sheets

APPARATUSES AND METHODS FOR TRANSMITTING AND RECEIVING CONTROL INFORMATION IN A WIRELESS COMMUNICATION SYSTEM BASED ON COGNITIVE RADIO (CR)

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Feb. 27, 2008 and assigned Serial No. 10-2008-0017675, the entire disclosure of which is hereby incorporated by reference.

TECHNICAL FIELD OF THE INVENTION

The present invention relates generally to a wireless communication system based on a Cognitive Radio (CR). More particularly, the present invention relates to apparatuses and methods for transmitting and receiving control information in the CR based wireless communication system.

BACKGROUND OF THE INVENTION

In accordance with the advance of wireless communication systems, services provided by the wireless communication systems are various. Further, to stably provide the various services of good quality, a rapid wireless data transmission technique is required. Various systems and methods have been suggested to realize the rapid wireless data transmission. Research is still conducted regarding faster data transmission techniques at the lower cost. The rapidly growing wireless communication systems need a separate frequency band for the coexistence with the existing techniques. However, frequency resources are limited and the existing systems are occupying most of the frequency resources.

In the frequency resource occupied by a particular system, the corresponding frequency band is not always in use. Accordingly, a scheme under consideration detects a time interval of the unused frequency resource and utilizes the frequency resource in the detected time interval. A wireless communication system based on Cognitive Radio (CR) is devised to carry out the wireless communication by reusing the temporarily free frequency resource occupied by the particular system. For example, a Television (TV) band frequently includes the frequency resource temporarily out of use. The Institute of Electrical and Electronics Engineers (IEEE) 802.22 is developing a standard for technical conditions required for the radio communication and solutions to the related problems, without affecting the TV broadcasting system.

In the CR based wireless communication system, the available band is determined depending on whether a licensed system uses the frequency resource or not. Hence, a base station of the CR based wireless communication system divides the frequency resources in the same unit as the frequency band unit used by the licensed system. For example, in the TV broadcasting system, the unit of the used frequency resource is a channel. The base station of the CR based wireless communication system needs to transmit control information per channel for terminals connected to the channels. The control information transmitted per channel passes through modulation and coding schemes according to a channel quality to make sure of the reception, and a repetitive coding. In other words, considerable overhead caused by the control information is inevitable. Thus, what is demanded is a method for reducing the overhead caused by the control information in the CR based wireless communication system.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for reducing overhead caused by control information in a CR based wireless communication system.

Another aspect of the present invention is to provide an apparatus and a method for preventing a duplicate transmission of control information in a CR based wireless communication system.

Yet another aspect of the present invention is to provide an apparatus and a method for selecting one control channel from available channels in a CR based wireless communication system.

Still another aspect of the present invention is to provide an apparatus and a method for transmitting control information over a control channel in a CR based wireless communication system.

According to one aspect of the present invention, an operating method of a base station in a CR based wireless communication system includes checking channels unused by a licensed system through a spectrum sensing; selecting one of the channels unused by the licensed system as a control channel based on a channel quality per channel; and transmitting control information to terminals within a cell over the control channel.

According to another aspect of the present invention, an operating method of a terminal in a CR based wireless communication system includes receiving control information over a control channel determined by a base station; confirming a channel allocated to the terminal based on the control information; and transmitting and receiving data by accessing the allocated channel.

According to yet another aspect of the present invention, an apparatus for base station in a CR based wireless communication system includes a sensor for checking channels unused by a licensed system through a spectrum sensing; an allocator for selecting one of the channels unused by the licensed system as a control channel based on a channel quality per channel; and a transmitter for transmitting control information to terminals within a cell over the control channel.

According to still another aspect of the present invention, an apparatus for a terminal in a CR based wireless communication system includes a receiver for receiving control information over a control channel determined by a base station; an interpreter for confirming a channel allocated to the terminal based on the control information; and a controller for controlling to communicate data by accessing the allocated channel.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a technique for transmitting and receiving control information in a wireless communication system based on a CR. Hereinafter, an Orthogonal Frequency Division Multiplexing (OFDM)/Orthogonal Frequency Division Multiple Access (OFDMA) wireless communication system is illustrated by way of example. Note that the present invention is applicable to other various wireless communication systems.

Figure 1:
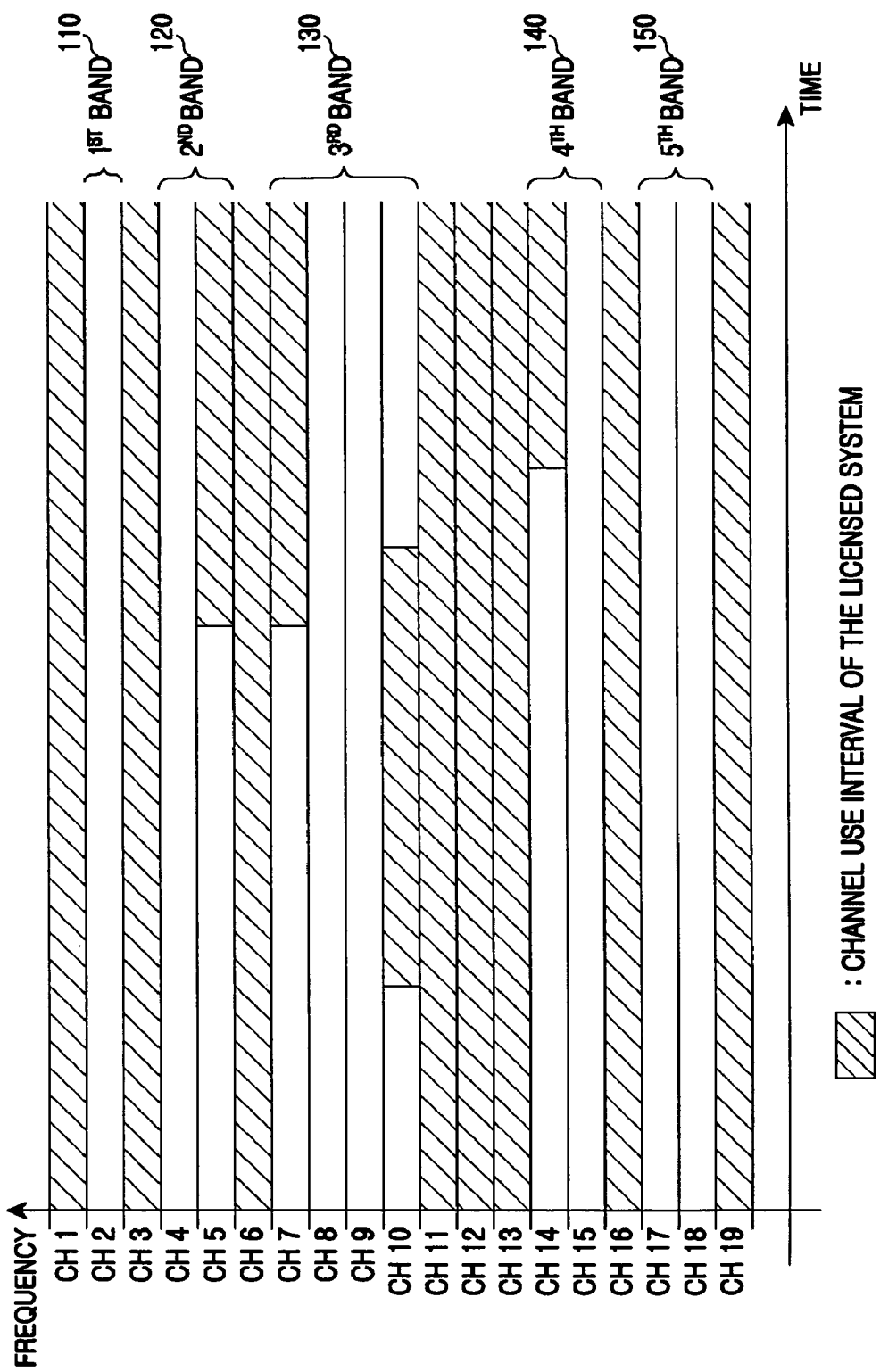
FIG. 1 illustrates available channels in a CR based wireless communication system.

Characteristics of the CR based wireless communication system are now described with a channel condition in detail. To facilitate the understanding, a channel condition of FIG. 1 is assumed. FIG. 1 depicts 19 channels used based on time. Each channel indicates a band use unit of a licensed system. For example, when the licensed system is a TV broadcasting system, the band occupied by one TV channel is a channel.

In FIG. 1, a first band 110 has a narrow bandwidth but exhibits a quite good channel quality. The first band 110 is not used by the licensed system. That is, even when the existing system obtains the license for the frequency band, it may not utilize all the bands in some cases. For example, the TV broadcasting system does not utilize the disused broadcasting channel band or the band occupied to add a future broadcasting channel for a long term. A second band 120 includes two channels with a poor channel quality. The licensed system uses some time intervals and some channels of the second band 120. A third band 130 has a wide bandwidth including four channels with a poor channel quality. The licensed system uses some time intervals and some channels of the third band 130. A fourth band 140 includes two channels with a good channel quality. The licensed system uses some time intervals and some channels of the fourth band 140. A fifth band 150 includes two channels. While the licensed system does not use the fifth band 150, the channel quality of the fifth band 150 is poor.

A base station and terminals in the CR based wireless communication system recognize the aforementioned channel condition by performing a spectrum sensing. The base station and the terminals select one channel as the control channel through a negotiation procedure. In the channel condition of FIG. 1, it is preferable to select the first band 110 as the control channel. Herein, the terminal can be referred to as a Consumer Premises Equipment (CPE).

Figure 2:
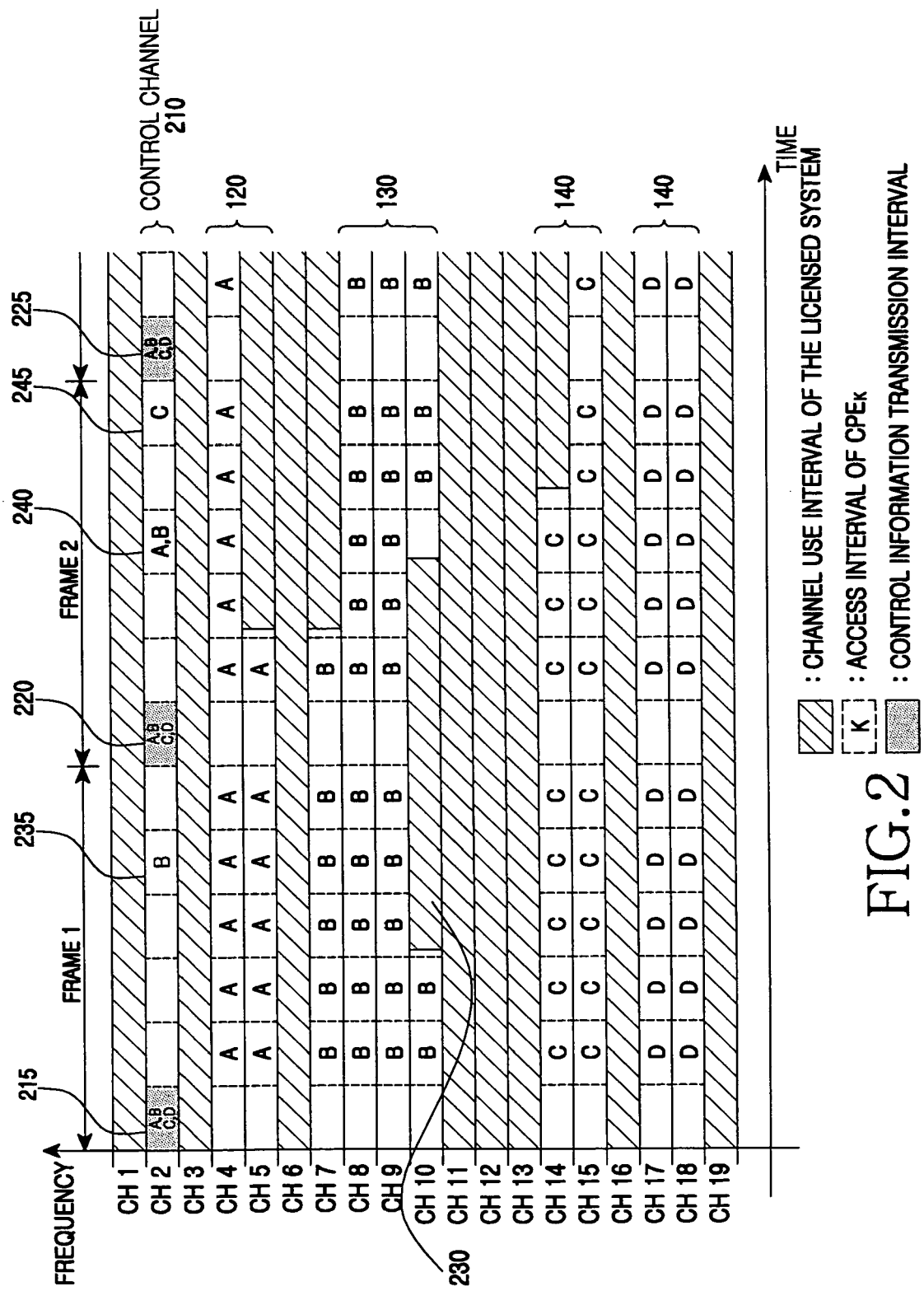
FIG. 2 illustrates a channel usage in the CR based wireless communication system according to an exemplary embodiment of the present invention.

Under the channel condition as shown in FIG. 2, the channel usage between four CPEs; that is, CPE_A, CPE_C, and CPE_D and the base station is now explained. The base station selects the channel (CH) '2' as the control channel 210. At the start of every frame, the base station transmits control information relating to CPE_A, CPE_B, CPE_C, and CPE_D over the control channel. Herein, the control information includes information required for the terminal prior to the communications, such as operating channel information of the CPEs, resource allocation information of each channel, Downlink Channel Descriptor (DCD), and Uplink Channel Descriptor (UCD). By transmitting the control information over the channel with a very good condition, a repetitive code is not required. Thus, the overhead caused by the control information is reduced. As the information common to the multiple CPEs are transmitted at a time, the overhead caused by the control information is lowered.

The CPEs access the control channel at the start 215, 220, 225 of every frame and obtain the control information required for the communication across the control channel. Next, each CPE accesses its allocated channel and performs the data communication in the remaining intervals of the frame. In the first time interval 215 of the first frame in FIG. 2, the base station transmits the control information and CPEs receive the control information over the control channel 210. In the second through sixth time intervals of the first frame, the CPE_A performs the communication in the second band 120, the CPE_B performs the communication in the third band 130, the CPE_C performs the communication in the fourth band 140, and the CPE_D performs the communication in the fifth band 150.

As above, the CPEs receive the control information and perform the data communication. Starting in the fourth time interval 230 of the first frame in FIG. 2, the CH 10 is used by the licensed system. Hence, the CPE_B is seriously affected by interference caused by the licensed system in the fourth time interval of the first frame, and a lot of errors occur in data received at the CPE_B. Upon recognizing the errors in the received data, the CPE_B accesses the control channel in the fifth time interval 235 of the first frame and then confirms channel allocation change information received from the base station. That is, when detecting a signal of the licensed system in the channel used by the CPEs, the base station changes the channel allocated to the CPE that is using the corresponding channel and transmits the channel allocation change information.

When there is an unused channel, the base station can sustain the service quality of the CPE_B by allocating a new channel to the CPE_B. Yet, since there is no unused channel in FIG. 2, the base station cannot allocate an additional channel to the CPE_B. As the control channel 210 is used only for the control information transmission, the base station can temporarily allocate the control channel to the CPE_B. Herein, the duration for the temporary allocation of the control channel differs in various exemplary embodiments. For example, the temporary allocation of the control channel can last until the spectrum sensing is re-performed.

Likewise, the control channel is temporarily allocated to the CPE_A and the CPE_B in the fourth time interval 240 of the second frame and the control channel is temporarily allocated to the CPE_C in the sixth time interval 245 of the second frame.

The frame division and the length of the control information transmission interval in FIG. 2 are arbitrarily determined to ease the understanding. The frame division and the length of the control information transmission interval vary according to the actual design of the system.

Figure 3:
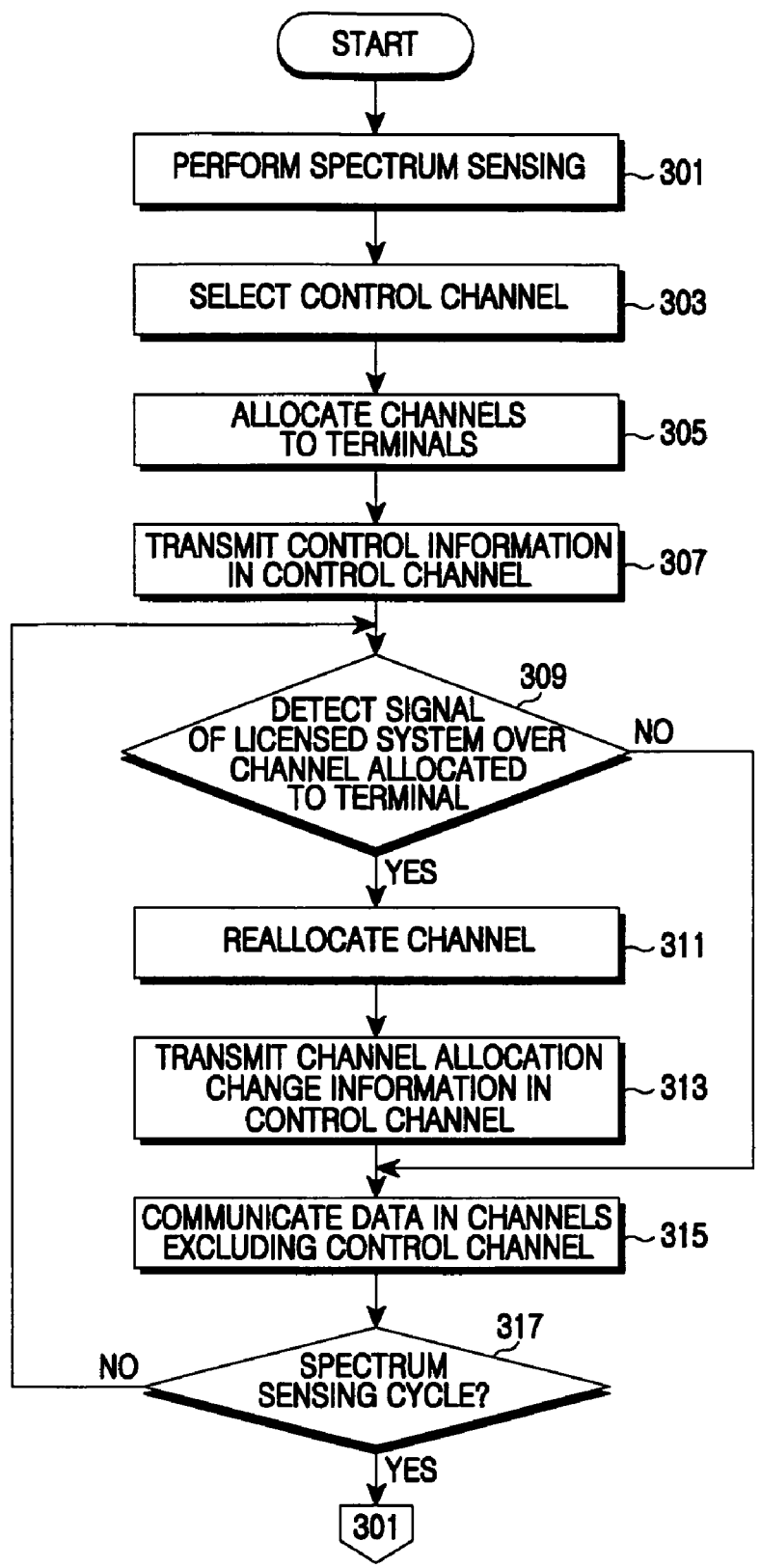
FIG. 3 illustrates operations of a base station in the CR based wireless communication system according to an exemplary embodiment of the present invention.

FIG. 3 is a flowchart outlining operations of the base station in the CR based wireless communication system according to an exemplary embodiment of the present invention.

In step 301, the base station performs the spectrum sensing. More specifically, by detecting the signal of the licensed system in the band of each channel, the base station confirms the channel condition; that is, the distribution of the channels used by the licensed system and the available channels.

After confirming the channel condition through the spectrum sensing, the base station selects one of the available channels as the control channel in step 303. The base station selects one control channel that has the good channel quality and that is not used continuously according to the observation. That is, the base station selects the control channel based on the channel quality and the used time of the licensed system.

In step 305, the base station allocates other available channels than the control channel to the terminals. The base station allocates the channels by taking into account the band use capability of each terminal and the distribution of the available channels. For example, the base station allocates four consecutive channels of the frequency axis to the terminal capable of using four channels at the same time.

In step 307, the base station transmits the control information over the control channel. Herein, the control channel includes information required for the terminal prior to the communication, such as channel allocation information, resource allocation information of the channels, DCD and UCD.

In step 309, the base station checks whether a signal of the licensed system is detected in at least one of the channels allocated to the terminal. In more detail, the base station continuously checks whether the signal of the licensed system is generated in the process of the communication with the terminals, and updates the channel condition information according to the generated signal of the licensed system.

When detecting the signal of the licensed system in the channel not allocated to the terminal, the base station proceeds to step 315.

When detecting the signal of the licensed system in the channel allocated to the terminal, the base station reallocates the channel in step 311. The base station withdraws the channel of the detected signal of the licensed system from the corresponding terminal. When there are the remaining channels, the base station additionally allocates the channel to the terminal of the withdrawn channel. In so doing, the base station can allocate the channel excluding the control channel or temporarily allocate the control channel.

In step 313, the base station transmits the channel allocation change information over the control channel. That is, the base station transmits the information relating to the withdrawn channel and the additional channel according to the channel reallocation of step 311.

In step 315, the base station communicates data with the terminals across the other channels than the control channel. When the control channel is temporarily allocated in step 311, the base station performs the data communication in the channels including the control channel.

In step 317, the base station checks whether it is a spectrum sensing cycle. That is, the base station examines the channel condition through the periodic spectrum sensing. In the spectrum sensing cycle, the base station goes back to step 301 and performs the spectrum sensing. By contrast, when it is not the spectrum sensing cycle, the base station returns to step 309.

Figure 4:
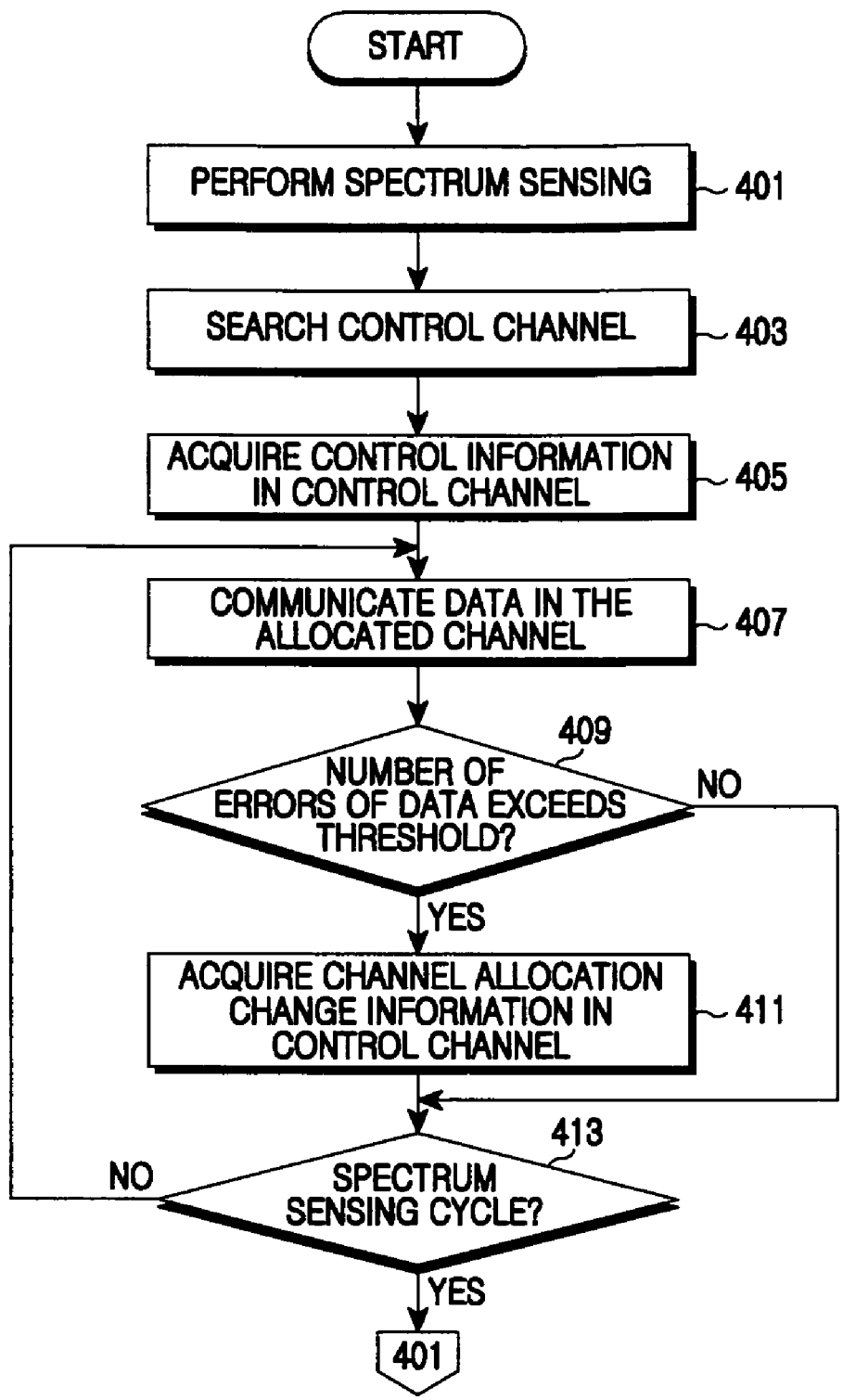
FIG. 4 illustrates operations of a terminal in the CR based wireless communication system according to an exemplary embodiment of the present invention.

FIG. 4 is a flowchart outlining operations of the terminal in the CR based wireless communication system according to an exemplary embodiment of the present invention.

In step 401, the terminal performs the spectrum sensing. More specifically, by detecting the signal of the licensed system in the band of each channel, the terminal confirms the channel condition; that is, the distribution of the channels used by the licensed system and the available channels.

In step 403, the terminal searches the control channel. By trying to receive the control information in the frame start of the available channels, the terminal searches the control channel from the available channels. Namely, the terminal identifies the control channel by checking whether the control information is received or not.

In step 405, the terminal acquires the control information in the control channel. Herein, the control channel includes information required for the terminal prior to the communication, such as channel allocation information, resource allocation information of each channel, DCD and UCD. The terminal confirms its allocated channel and the resource allocation information of the allocated channel based on the control information.

In step 407, the terminal communicates data in the allocated channel. Herein, the number of the allocated channels is one or more.

In step 409, the terminal checks whether the number of errors in the data received from the base station exceeds a threshold. In more detail, the terminal checks for errors in the received data using a Cyclic Redundancy Check (CRC) and determines whether the number of the errors exceeds the threshold. The terminal, using the number of the errors of the data, determines whether the signal of the licensed system is generated in the channel in use. When the number of the errors falls below the threshold, the terminal goes to step 413.

When the number of the errors exceeds the threshold, the terminal acquires the channel allocation change information over the control channel in step 411. The terminal, recognizing the signal of the licensed channel in the channel, accesses the control channel to obtain the information of the channel reallocation of the base station and receives the channel allocation change information over the control channel.

In step 413, the terminal checks whether it is a spectrum sensing cycle. That is, the terminal examines the channel condition through the periodic spectrum sensing. In the spectrum sensing cycle, the terminal goes back to step 401 and performs the spectrum sensing. By contrast, when it is not the spectrum sensing cycle, the base station returns to step 407.

Figure 5:
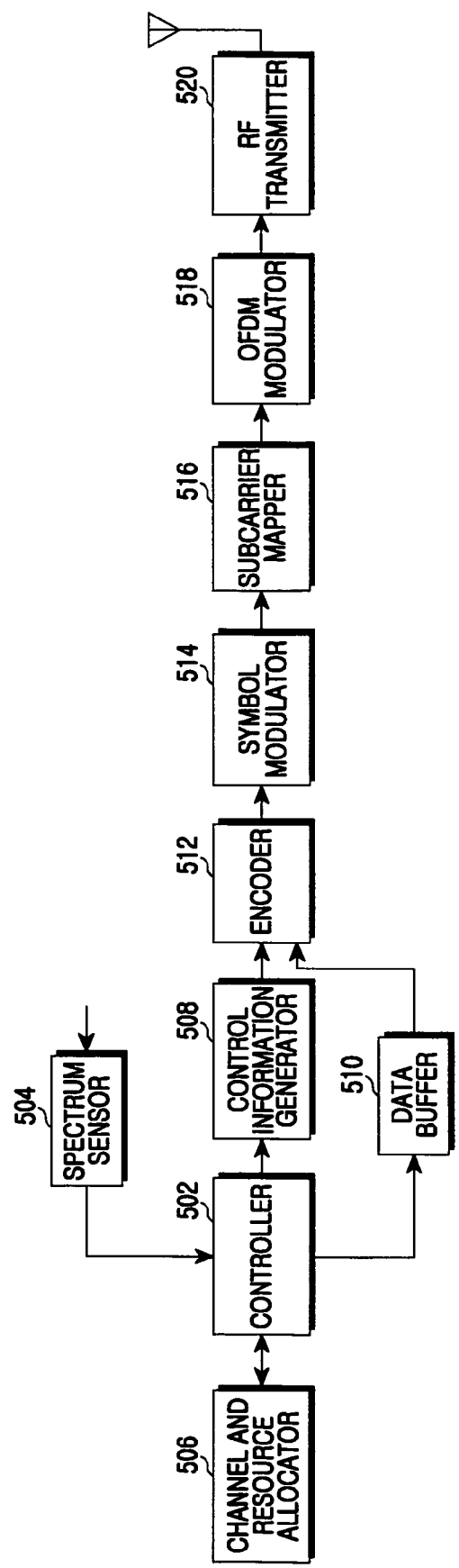
FIG. 5 illustrates the base station in the CR based wireless communication system according to an exemplary embodiment of the present invention.

FIG. 5 is a block diagram of the base station in the CR based wireless communication system according to an exemplary embodiment of the present invention.

The base station of FIG. 5 includes a controller 502, a spectrum sensor 504, a channel and resource allocator 506, a control information generator 508, a data buffer 510, an encoder 512, a symbol modulator 514, a subcarrier mapper 516, an OFDM modulator 518, and a Radio Frequency (RF) transmitter 520.

The controller 502 controls the base station. For instance, the controller 502 provides necessary information to the blocks and triggers the operations of the blocks.

The spectrum sensor 504 acquires the channel condition through the periodic spectrum sensing. More specifically, by detecting the signal of the licensed system in the band of each channel using the signal per band received via a receiver (not shown), the spectrum sensor 504 confirms the channel condition; that is, the distribution of the channels used by the licensed system and the available channels. The spectrum sensor 504 provides the channel condition information to the controller 502.

The channel and resource allocator 506 allocates the channels to the terminals and allocates radio resources of the channel. The channel and resource allocator 506 selects one of the available channels as the control channel. The channel and resource allocator 506 selects one control channel that has the good channel quality and is not used continuously according to the observation. That is, the channel and resource allocator 506 selects the control channel based on the channel quality and the used time of the licensed system.

The channel and resource allocator 506 allocates the other available channels than the control channel to the terminals. The channel and resource allocator 506 allocates the channels by taking into account the band use capability of each channel and the distribution of the available channels.

The channel and resource allocator 506 reallocates the channels depending on the signal generation of the licensed system. When detecting the signal of the licensed system in the channel allocated to the terminal, the channel and resource allocator 506 withdraws the channel of the detected signal of the licensed system from the corresponding terminal. When there are the remaining channels, the channel and resource allocator 506 additionally allocates the channel to the terminal of the withdrawn channel. Alternatively, the channel and resource allocator 506 temporarily allocates the control channel to the terminal of the withdrawn channel.

The control information generator 508 generates the control information to be transmitted in the control channel and the control information to be transmitted in each channel. Herein, the control channel to be transmitted in the control channel includes information required for the terminal prior to the communications, such as channel allocation information, resource allocation information of each channel, DCD, and UCD. The control information generator 508 also generates the channel allocation change information including the channel reallocation information that is carried out according to the signal generation of the licensed system. The data buffer 510 stores data to be transmitted to the terminals over the channels excluding the control channel, and outputs the stored data according to the resource allocation of the channel and resource allocator 506.

The encoder 512 channel-codes the information bit stream provided from the control information generator 508 and the data buffer 510. The symbol modulator 514 modulates the channel-coded bit stream to complex symbols. The subcarrier mapper 516 maps the complex symbols into the frequency domain according to the resource allocation of the channel and resource allocator 506. The subcarrier mapper 516 maps the control information to be sent over the control channel and the channel allocation information to the subcarriers corresponding to the band of the control channel. The OFDM modulator 518 converts the complex symbols mapped into the frequency domain to a time-domain signal through Inverse Fast Fourier Transform (IFFT) and constitutes OFDM symbols by inserting a Cyclic Prefix (CP). The RF transmitter 520 up-converts the baseband signal to an RF signal and transmits the RF signal via an antenna.

Figure 6:
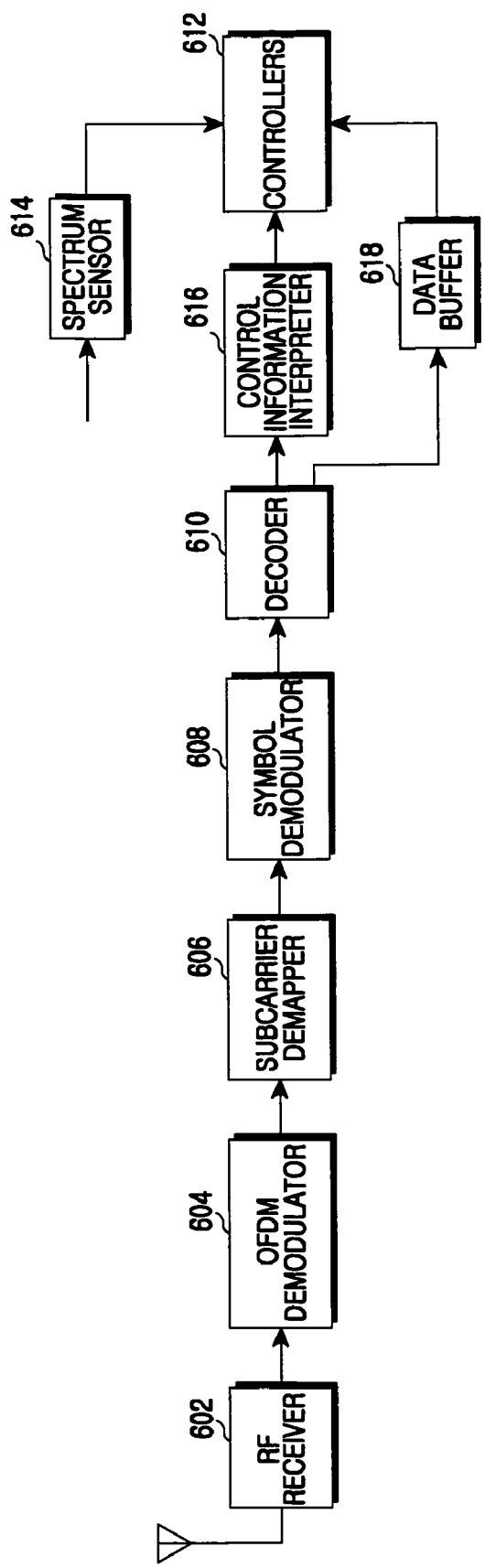
FIG. 6 illustrates the terminal in the CR based wireless communication system according to an exemplary embodiment of the present invention.

FIG. 6 is a block diagram of the terminal in the CR based wireless communication system according to an exemplary embodiment of the present invention.

The terminal of FIG. 6 includes an RF receiver 602, an OFDM demodulator 604, a subcarrier demapper 606, a symbol demodulator 608, a decoder 610, a controller 612, a spectrum sensor 614, a control information interpreter 616, and a data buffer 618.

The RF receiver 602 down-converts the RF signal received via an antenna to a baseband signal. The OFDM demodulator 604 divides the signal output from the RF receiver 602 to OFDM symbols, removes the CP, and restores the complex symbols mapped into the frequency domain through the FFT. The subcarrier demapper 606 extracts the signal mapped to its allocated resource from the complex symbols mapped into the frequency domain. In particular, the subcarrier demapper 606 extracts the signal of the control information from the subcarriers corresponding to the control channel. The symbol demodulator 608 demodulates the complex symbols to a bit stream. The decoder 610 restores the information bit stream by channel-decoding the bit stream.

The controller 612 controls the base station. For instance, the controller 612 provides necessary information to the blocks and triggers the operations of the blocks. By trying to receive the control information in the frame start of the available channels, the controller 612 searches the control channel from the available channels. The controller 612 identifies the control channel by checking whether the control information is received or not. The controller 612 confirms the channel allocated to the terminal using the control information received in the control channel and controls to perform the data communication by accessing the allocated channel. The controller 612 checks for error in the received data. When the number of the errors exceeds the threshold, the controller 612 controls to receive the channel allocation change information across the control channel.

The spectrum sensor 614 acquires the channel condition through the periodic spectrum sensing. More specifically, by detecting the signal of the licensed system in the band of each channel using the received signal per band, the spectrum sensor 614 confirms the channel condition; that is, the distribution of the channels used by the licensed system and the available channels. The spectrum sensor 614 provides the channel condition information to the controller 612.

The control information interpreter 616 interprets the control information received from the base station in the control channel. Herein, the control channel received in the control channel includes information required for the terminal prior to the communications, such as channel allocation information, resource allocation information of each channel, DCD, and UCD. The control information interpreter 616 also interprets the channel allocation change information including the reallocation information which is conducted according to the signal of the licensed system received in the control channel. The control information interpreter 616 provides the information acquired from the control information to the controller 612. The data buffer 618 temporarily stores the data received from the base station across the channels excluding the control channel.

As set forth above, the CR based wireless communication system utilizes the control channel of the good channel quality and out of use for a long term. Therefore, the overhead caused by the control information transmission can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method of a base station in a wireless communication system based on a cognitive radio, the method comprising:
   determining channels unused by a licensed system through a spectrum sensing;
   determining one of the channels unused by the licensed system as a control channel based on a channel quality per channel; and
   transmitting control information to terminals within a cell over the control channel,
   wherein the control channel is divided along a time axis into a plurality of frames, each frame divided into a first time interval which carries the control information and a second time interval that can be allocated for data communication, the first time interval and the second time interval occupying a same position and having a same duration in each frame.

2. The method of claim 1, further comprising:
   allocating the channels unused by the licensed system, excluding the control channel, to the terminals; and
   transmitting control information which comprises channel allocation information, across the control channel.

3. The method of claim 2, further comprising:
   withdrawing the channel allocated to a terminal which uses at least one channel when detecting a signal of the licensed system in the at least one channel allocated to the terminals.

4. The method of claim 3, further comprising:
   transmitting channel allocation change information to the terminal which uses the at least one channel, across the first time interval of the control channel.

5. The method of claim 3, further comprising:
   temporarily allocating a resource in the second time interval of the control channel to the terminal which uses the at least one channel.

6. The method of claim 3, further comprising:
   additionally allocating an unused channel to the terminal which uses the at least one channel.

7. The method of claim 1, wherein the control information comprises at least one of channel allocation information, resource allocation information of each channel, a downlink channel descriptor, and an uplink channel descriptor.

8. An operating method of a tell final in a wireless communication system based on a cognitive radio, the method comprising:
   receiving control information over a control channel determined by a base station;
   determining a channel allocated to the terminal based on the control information; and
   transmitting and receiving data by accessing the allocated channel,
   wherein the control channel is divided along a time axis into a plurality of frames, each frame divided into a first time interval which carries the control information and a second time interval that can be allocated for data communication, the first time interval and the second time interval occupying a same position and having a same duration in each frame.

9. The method of claim 8, further comprising:
   determining channels unused by a licensed system through a spectrum sensing; and
   determining a control channel by checking signals received in the channels unused by the licensed system in a start of a frame.

10. The method of claim 8, further comprising:
    receiving channel allocation change information over the control channel when the number of errors in the data received over the first time interval of the allocated channel exceeds a threshold.

11. The method of claim 8, wherein the control information comprises at least one of channel allocation information, resource allocation information of each channel, a downlink channel descriptor, and an uplink channel descriptor.

12. An apparatus for base station in a wireless communication system based on a cognitive radio, the apparatus comprising:
    a sensor configured to determine channels unused by a licensed system through a spectrum sensing;
    an allocator configured to determine one of the channels unused by the licensed system as a control channel based on a channel quality per channel; and
    a transmitter configured to transmit control information to terminals within a cell over the control channel,
    wherein the control channel is divided along a time axis into a plurality of frames, each frame divided into a first time interval which carries the control information and a second time interval that can be allocated for data communication, the first time interval and the second time interval occupying a same position and having a same duration in each frame.

13. The apparatus of claim 12, wherein the allocator is further configured to allocate the channels unused by the licensed system, excluding the control channel, to the terminals, and
    the transmitter is further configured to transmit control information which comprises channel allocation information across the control channel.

14. The apparatus of claim 13, wherein, the allocator is further configured to withdraw the channel allocated to a terminal which uses at least one channel when detecting a signal of the licensed system in the at least one channel allocated to the terminals.

15. The apparatus of claim 14, wherein the transmitter is further configured to transmit channel allocation change information to the terminal which uses the at least one channel, across the first time interval of the control channel.

16. The apparatus of claim 14, wherein the allocator is further configured to temporarily allocate a resource of the second time interval of the control channel to the terminal which uses the at least one channel.

17. The apparatus of claim 14, wherein the allocator is further configured to additionally allocate an unused channel to the terminal which uses the at least one channel.

18. The apparatus of claim 12, wherein the control information comprises at least one of channel allocation information, resource allocation information of each channel, a downlink channel descriptor, and an uplink channel descriptor.

19. An apparatus for a terminal in a wireless communication system based on a cognitive radio, the apparatus comprising:
- a receiver configured to receive control information over a control channel determined by a base station;
- an interpreter configured to confirm a channel allocated to the terminal based on the control information; and
- a controller configured to control to communicate data by accessing the allocated channel,
- wherein the control channel is divided along a time axis into a plurality of frames, each frame divided into a first time interval which carries the control information and a second time interval that can be allocated for data communication, the first time interval and the second time interval occupying a same position and having a same duration in each frame.

20. The apparatus of claim 19, further comprising:
- a sensor configured to confirm channels unused by a licensed system through a spectrum sensing,
- wherein the controller is further configured to identify a control channel by checking signals received in a start point of a frame over the channels unused by the licensed system.

21. The apparatus of claim 19, wherein the controller is further configured to control the receiver to receive channel allocation change information over the first interval of the control channel when the number of errors in the data received over the allocated channel exceeds a threshold.

22. The apparatus of claim 19, wherein the control information comprises at least one of channel allocation information, resource allocation information of each channel, a downlink channel descriptor, and an uplink channel descriptor.

* * * * *